W. E. DERRICK.
LAWN MOWER.
No. 245,357.
Patented Aug. 9, 1881.
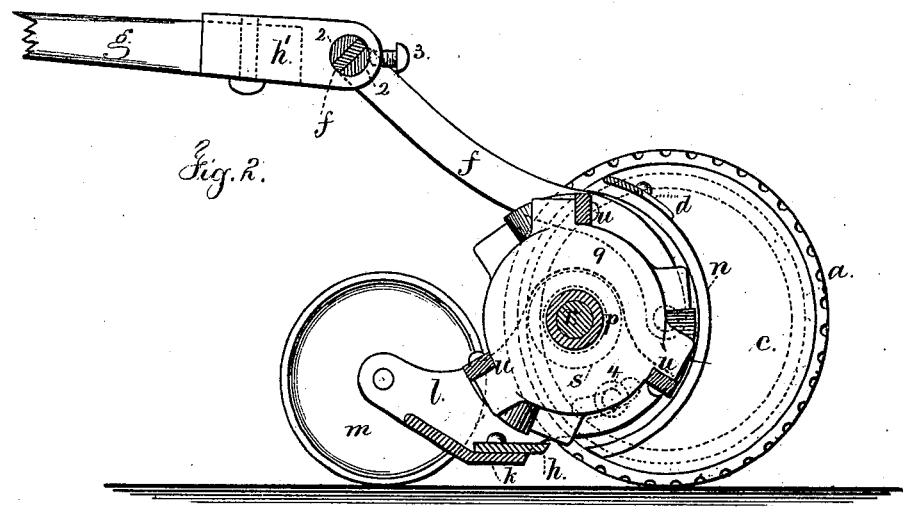
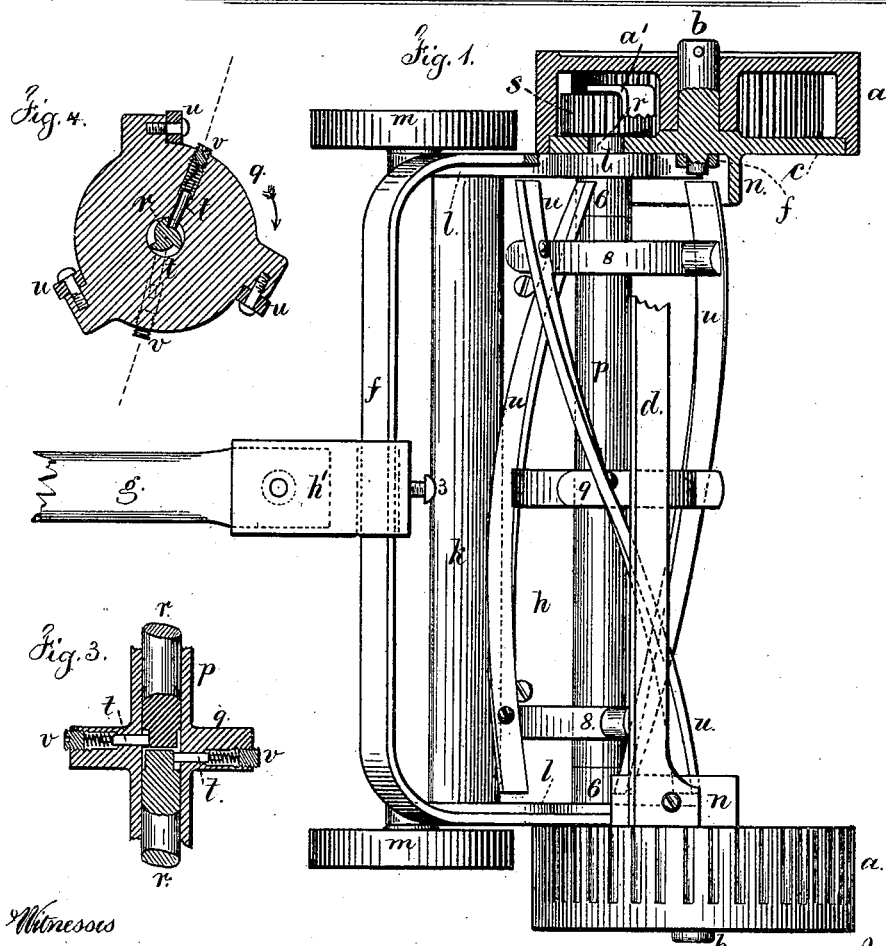

UNITED STATES PATENT OFFICE.

WILLIAM E. DERRICK, OF PALMYRA, NEW YORK, ASSIGNOR TO EVERETT G. PASSMORE, OF PHILADELPHIA, PENNSYLVANIA.

LAWN-MOWER.

SPECIFICATION forming part of Letters Patent No. 245,357, dated August 9, 1881.

Application filed December 22, 1879.

*To all whom it may concern:*

Be it known that I, WILLIAM E. DERRICK, of Palmyra, in the county of Wayne and State of New York, have invented an Improvement in Lawn-Mowers, of which the following is a specification.

Lawn-mowers have been made with a pair of driving-wheels that turn the revolving cutter or beater.

My invention is to be distinguished from the devices heretofore made in the particulars hereinafter set forth.

In the drawings, Figure 1 is a plan of the mower with the driving-wheel at one end in section. Fig. 2 is a section vertically and in line with the handle. Fig. 3 is a horizontal section of the beater and its arbors, and Fig. 4 is a transverse section through the center hub of the beater.

I make use of two driving-wheels, *a a*, made in the form of cylindrical shells, each having an internal hub, surrounding and revolving upon the gudgeon *b*, that projects outwardly from the center of the disks *c*. These disks *c* are connected to each other by the cross-bar *d*, that is bolted upon the segmental flanges *n*, which also form guards to the beaters, as hereinafter described.

The bail *f* is made of flat iron, with eyes at its ends, and these eyes receive the inner ends of the gudgeons *b*, so that the power that is employed to move the machine acts directly at the centers of the driving-wheels.

The handle *g* is provided with a metal stock at the lower end, having a circular transverse hole, through which the bail *f* passes. There are segmental gibs 2 2 at each side of the flat bail to fill the hole in the stock *h'*, so that the handle can be turned to any desired inclination and then clamped upon the bail by the screw 3, which passes through the stock *h'* and acts against one of the gibs 2.

*h* is the fixed knife, which rests upon and is clamped to the knife-bar *k*, and there are slots in the bar *k* for the screws by which the knife is attached, so that the knife can be set forward as its edge wears away. At the ends of the bar *k* there are the plates *l*, forming, with the said bar *k*, a frame, the rear portions of which are supported by the rollers or wheels *m*, and the front portions of the frame *l* pass in between the disks *c*, and are secured thereto.

There are hubs 6 upon the disks *c*, through which the arbors *r* of the beaters pass. These hubs go through eyes or holes formed in the end plates, *l*, and there are clamping-screws 4, that pass through slots in the disks *c* into these plates *l*, to clamp them.

It will now be understood that the cutter or knife *h* is between the wheels *a* and rollers *m*, and that its edge is nearly beneath the arbor *r*; hence if the disks *c* are turned partly one way or the other the edge of the knife will be raised or lowered, and that it will be held by the screws 4, clamping the end plates, *l*, and disks *c* together after the parts have been adjusted. By this means the height of the cut can be varied as desired.

Each arbor *r* has a pinion, *s*, upon its end, gearing into the teeth of the internal gear formed within the cylindrical wheel *a*, and a bracket, *a'*, extending from the disk *c*, forms the bearing for the end of the arbor and retains it in place endwise. The tubular shaft *p* surrounds the arbors *r*, and upon this shaft *p* are the hubs 8 8 and 9, to which the twisted or helical beaters *u* are attached. These beaters *u* are similar to the other beaters made use of in lawn-mowers, except that the faces, instead of standing radially, are inclined so that a line drawn across the knife from the angle that comes into contact with the stationary knife *k* will be almost vertical, instead of inclining to the center of the beater. The object of this is to throw the cut grass to the rear, instead of throwing it upwardly or over the beater toward the front, as often happens in other mowers.

In order to connect the arbors *r* with the beater, I employ spring-pawls, located, by preference, in the central hub, 9, as seen in Fig. 4. The shafts or arbors *r* come end to end in the center of the tubular shaft *p*, and in each arbor, near the end, there are two or more ratchet-notches, and into radial holes in the hub 9, placed so as to reach the side of each arbor, near the end, are placed sliding pawls *t*, with inclined ends, to take the teeth on the arbors, and helical springs, retained by screw-caps $v$, keep the pawls up to their place. When the mower is being drawn back these pawls allow the arbors to turn without revolving the beaters, and when the machine is driven forward the teeth on the arbors, engaging the pawls, cause the rotation of the tubular shaft and beaters in the direction indicated by the arrow. When the mower is being turned around one wheel will continue the revolution of the beater, even if the other wheel may be stationary or revolving in the opposite direction.

The segmental flanges $n$ on the disks $c$, being in front of the ends of the revolving knives or beaters $u$, prevent the grass passing to the journal of the beaters, and hence the grass is not twisted around such journals.

I am aware that the supporting-rollers have been placed between end plates and made adjustable in relation to the knife-bar and beaters; but in this instance the end plates did not swing upon the shaft or bearings of the revolving beaters. By my construction the parts are very much simplified.

I claim as my invention—

1. In combination with the flat iron bail of the lawn-mower, a handle-stock, $h'$, having a hole through which the bail passes, and the segmental gibs 2, to secure the said stock and handle to the bail at any desired inclination, substantially as set forth.

2. The knife $h$, bar $k$, and end piece, $l$, in combination with the beaters, the shaft or arbor of which passes through holes in the end pieces $l$, and on which the said knife-bar frame can be adjusted, the clamping-screws 4, driving-wheels, and supporting-rollers, substantially as specified.

Signed by me this 16th day of September, A. D. 1879.

WILLIAM E. DERRICK.

Witnesses:
H. F. CULVER,
W. I. REID.